United States Patent [19]

Matthews

[11] 4,025,240
[45] May 24, 1977

[54] GEOTHERMAL ENERGY CONTROL SYSTEM AND METHOD

[75] Inventor: Hugh B. Matthews, Acton, Mass.

[73] Assignee: Sperry Rand Corporation, New York, N.Y.

[22] Filed: Nov. 10, 1975

[21] Appl. No.: 630,245

Related U.S. Application Data

[62] Division of Ser. No. 487,405, July 10, 1974, Pat. No. 3,938,334.

[52] U.S. Cl. .............. 417/365; 417/379; 417/407; 417/408
[51] Int. Cl.² ............... F04B 17/00; F04B 47/08
[58] Field of Search .......... 417/365, 379, 405, 406, 417/407, 408, 409, 424; 60/641; 175/107; 308/227

[56] References Cited

UNITED STATES PATENTS

| | | | |
|---|---|---|---|
| 2,633,392 | 3/1953 | Luenberger | 415/107 |
| 2,736,825 | 2/1956 | Hill | 417/424 |
| 2,739,756 | 3/1956 | Walter | 417/407 X |
| 3,664,758 | 5/1972 | Sato | 417/365 X |
| 3,740,163 | 6/1973 | Schinnerer et al. | 417/407 X |
| 3,817,653 | 6/1974 | Onal | 417/405 X |
| 3,824,793 | 7/1974 | Matthews | 60/641 |
| 3,890,065 | 6/1975 | Eller et al. | 417/408 X |
| 3,947,153 | 3/1976 | Matthias et al. | 417/365 |

Primary Examiner—Carlton R. Croyle
Assistant Examiner—Leonard Smith
Attorney, Agent, or Firm—Howard P. Terry

[57] ABSTRACT

A geothermal energy transfer and utilization system makes use of thermal energy stored in hot solute-bearing well water to generate super-heated steam from an injected flow of clean water; the super-heated steam is then used for operating a turbine-driven pump at the well bottom for pumping the hot solute-bearing water at high pressure and in liquid state to the earth's surface, where it is used by transfer of its heat to a closed-loop boiler-turbine-alternator combination for the generation of electrical or other power. Residual concentrated solute-bearing water is pumped back into the earth. The clean cooled water is regenerated at the surface-located system and is returned to the deep well pumping system also for lubrication of a novel bearing arrangement supporting the turbine-driven pump system. The bearing system employs liquid lubricated thrust and radial bearings with all bearing surfaces bathed in clean water serving as a lubricant and maintained under pressure to prevent entry into the bearings of contaminated geothermal fluid, an auxiliary thrust ball bearing arrangement comes into operation when starting or stopping the pumping system.

2 Claims, 14 Drawing Figures

GEOTHERMAL ENERGY CONTROL SYSTEM AND METHOD

CROSS REFERENCE TO RELATED APPLICATION

This is a division of application Ser. No. 487,405, now U.S. Pat. No. 3,938,334 filed July 10, 1974, and entitled "Improved Geothermal Energy Control System and Method" in the name of Hugh B. Matthews.

BACKGROUND OF THE INVENTION

1. Field of the Invention

The invention relates generally to efficient means for the generation of electrical or other power utilizing energy from geothermal sources and, more particularly, relates to arrangements including efficient super-heated steam generation and pumping equipment for application in deep, hot water wells for the transfer of thermal energy for use at the earth's surface.

2. Description of the Prior Art

While geothermal energy sources have been employed for the generation of power to a limited extent, generally known prior systems operate at relatively low efficiency and have serious disadvantages. In the relatively few installations in which substantially dry steam is supplied by wells at the earth's surface, the steam may be fed, after removal of solid matter, from the well head directly to a turbine. On the other hand, most geothermal wells are characterized by yields or a mixture of steam and hot water containing corrosive solutes at the earth's surface, so that the water must be separated from the steam before the latter is used in a turbine.

In both of these kinds of installations, relatively low pressure steam normally results, requiring special turbines and yielding relatively inefficient power generation as compared to generation of power using normally operated fossil fuel-powered or nuclear-powered electrical generation equipment. In only a few instances do geothermal wells actually produce truly super-heated steam with only minor amounts of undesired gasses and with no liquid water.

The presence of significant amounts of liquid water in wells used with prior art geothermal systems presents other problems in addition to the separation problem. If the water is only moderately hot, extracting thermal energy from it may be expensive or, at least, inefficient. Whether or not the heat is used, the water must be handled. The water usually bears considerable concentrations of silica and of alkali salts, including chloride, sulfate, carbonate, borate, and the like ions, all of which dissolved salts present precipitation problems at the point at which any part of the water may abruptly flash into steam. If the alkaline water is allowed to escape at the installation, severe chemical and thermal pollution of streams or rivers may result. Finally, there is some evidence that the removal of large amounts of water from geothermal reservoirs may lead, in a generally unpredictable manner, to undesirable land subsidence in the vicinity of thermal well installations.

A major advance in the art of extraction and use of geothermal energy is reflected in the H. B. Matthews U.S. patent application Ser. No. 300,058 for a "Geothermal Energy System and Method", filed Oct. 24, 1972 issued July 25, 1974 as U.S. Pat. No. 3,824,793, and assigned to the Sperry Rand Corporation. The prior Matthews invention provides means for efficient power generation employing energy derived from geothermal sources through the generation of dry, super-heated steam and the consequent operation of sub-surface equipment for pumping extremely hot well water at high pressures upward to the earth's surface. Clean water is injected at a first or surface station into the deep well where thermal energy stored in hot solute-bearing deep well water is used at a second or deep well station to generate super-heated steam from the clean water. The resultant dry super-heated steam is used at the well bottom for operating a turbine-driven pump for pumping the hot solute-bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located boiler-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

In constrast with the relatively poor performance of other prior art systems, the prior Matthews invention is characterized by high efficiency as well as by many other advantageous features. It is not limited to use with the rare dry steam sources, and it is devoid of the water and steam separation problems attached to the more usual prior art systems used with mixed steam and hot water supply wells. Since the novel power system operates with dry, highly super-heated steam, existing efficient heat transfer elements and efficient high pressure turbines may readily be employed. According to the invention, the very large calorific content of high temperature water subjected to high pressure is efficiently employed. Since high pressure liquid is used as the thermal transfer medium, undesired flash steam formation is prevented, along with its undesired attendant deposition of dissolved materials. Because the dissolved salts are efficiently pumped back deep into the earth as remotely as need be from the geothermal source, surface pollution effects are avoided and there is relatively little risk of land sinkage in the vicinity of the geothermal source.

SUMMARY OF THE INVENTION

The invention is an improvement in deep well geothermal systems of the kind described in the aforementioned U.S. Pat. No. 3,824,793; according to the present invention, there is provided an efficient means for the generation of electrical power at the earth's surface, using energy abstracted from the geothermal source. The apparatus includes means for the efficient generation of super-heated steam and a steam driven pumping system at the well bottom operated for transfer of hot water to the earth's surface where its energy content is beneficially used for power generation.

According to one feature of the invention, the deep-well steam turbine and pump arrangements are supported in a novel system of hydrodynamic thrust and radial bearings with all bearing surfaces fully bathed in clean water serving as a lubricant and maintained under pressure so as to prevent entry of the corrosive and contaminated hot well water and the consequent ultimate destruction of bearing surfaces. Alternatively, a bearing configuration employing hydrodynamic bearing elements may be employed. A thrust ball bearing arrangement is provided that normally comes into play only when starting or stopping the turbine-hot water pump system. A further feature of the invention permits use of surface-located apparatus for assuring efficient continuous operation of the power generation system and also enables controlled starting and stopping of the subterranean steam turbine-pump apparatus. A further aspect of the invention permits efficient steam generation in a confined annular volume lying between concentric vertical tubes; the feature causes a spiralling downward flow of steam and of the diminishing population of water drops so that they both flow in close proximity to the hottest of the two tubes, thus improving the efficiency of steam formation.

DESCRIPTION OF THE PREFERRED EMBODIMENTS

Figure 1:
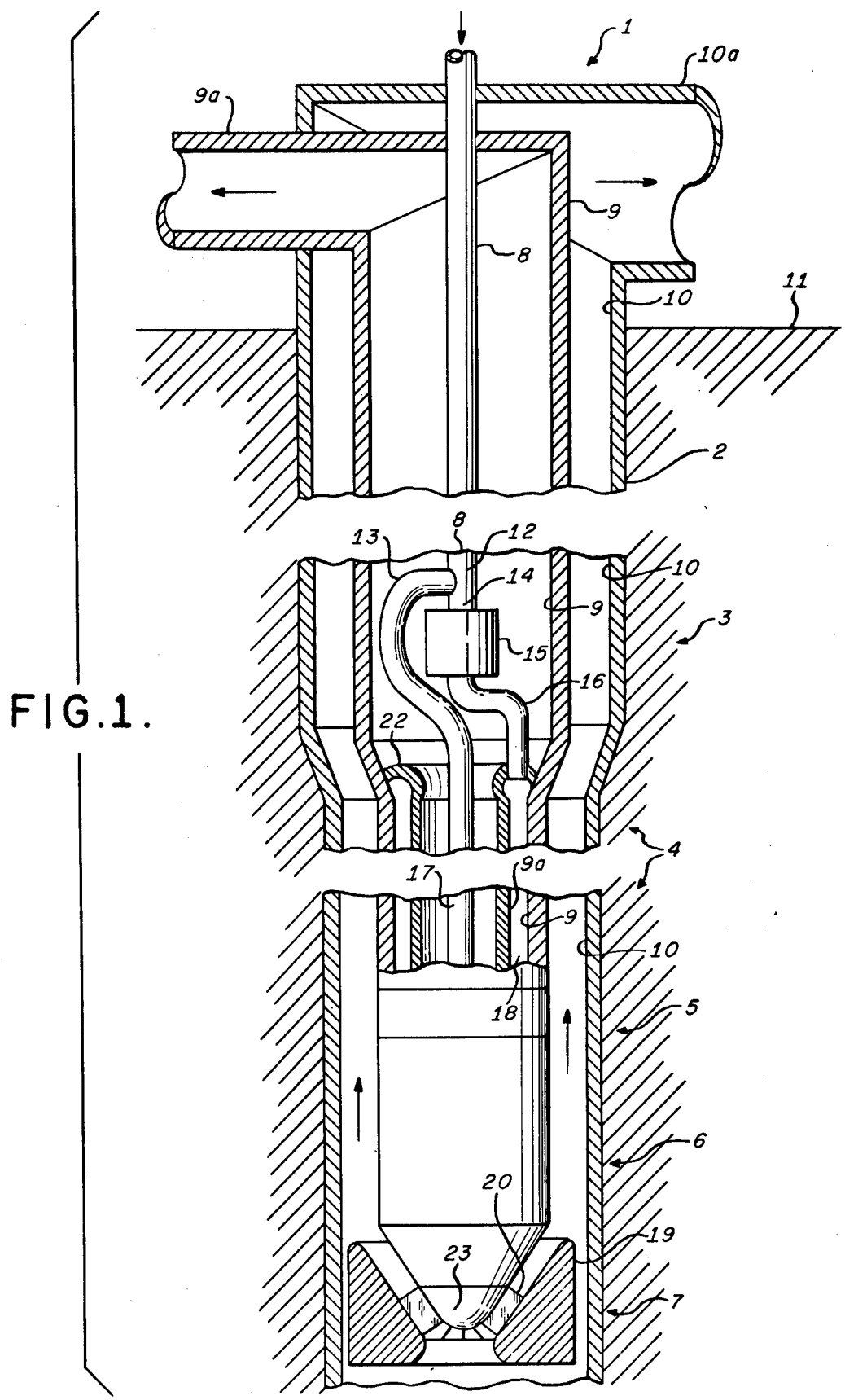
FIG. 1 is an elevation view, mostly in cross section, of the novel deep well geothermal pumping apparatus of the system.

FIG. 1 illustrates the general structure and characteristics of that portion of the novel geothermal energy extraction system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located above the earth's surface 11 and a main well section 2 extending downward from well head section 1 and below the earth's surface 11. At the subterranean source of hot, high pressure water, the main well section 2 joins at steam generator input section 3. The steam generator section 4, the steam turbine section 5, a power plant rotary bearing section 6, and a hot water pumping section 7 follow in close cooperative succession at increasing depths.

Extending downward from the well head section 1 at the earth's surface 11, the well casing pipe 10 surrounds in preferably concentric relation an innermost stainless steel or other high quality alloy steel pipe or conduit 8 for supplying a flow of relatively cool and relatively pure water at the bottom of the well for purposes yet to be explained. A second relatively large pipe or conduit 9 of similar quality and surrounding pipe 8 is also provided within well casing 10, extending from well head 1 to the energy conversion and pumping system at the bottom of the well and permitting turbine exhaust steam to flow to the surface of the earth, as will be described.

It will be seen from FIG. 1 that relatively clean and cold water is pumped down the inner pipe 8 from the surface 11 station to the region of the pipe tee 12. At tee 12, the downward flowing water is divided between two branch paths. As will be described, a first branch path feeds clean lubricating water through pipes 13 and 17 for lubricating a system of bearings within the system bearing section 6. The second branch path feeds clean water through pressure regulator system 15 and via distribution pipe or pipes 16 to the input manifold 22 of a steam generator 18 formed between the generally concentric walls of alloy pipes 9 and 9a. Accordingly, high pressure steam is generated and delivered to a steam turbine located within turbine section 5.

The function of the turbine located at 5 and supported on bearings located within bearing section 6 is to drive a hot water pump located at section 7. Hot, high pressure water is thus impelled upward by the rotating pump vanes 20 between the rotating conical end 23 of the pump and an associated rotating or stationary shroud 19; the hot water is pumped upward at high velocity in the annular conduit between pipes 9 and 10, thus permitting use of the thermal energy it contains at the earth's surface, as will be described. More important, the hot water is pumped upward to the earth's surface 11 at a pressure preventing it from flashing into steam and thus undesirably depositing dissolved salts at the point of flashing.

Accordingly, it is seen that the extremely hot, high-pressure well water is pumped upward, flowing in the annular region defined by alloy pipes 9 and 10. Heat supplied by the hot well water readily converts the clean water flowing into manifold 22 of the steam generator 18 into highly energetic, dry, super-heated steam. The clean water, before flowing through tee junction 12 and pressure regulator 15, is at a very high pressure due to its hydrostatic head and usually also to pressure added by a surface pump yet to be discussed, so that it may not flash into steam. The pressure regulator system 15 controls the pressure of the clean water flowing therethrough so that it may be vaporized and superheated in the volume 18 of the steam generator. The highly energetic steam drives the steam turbine and is redirected to flow upward to the surface 11 after expansion as relatively cool steam flowing within the annular conduit defined between alloy pipes 8 and 9. Thermal energy is recovered, as will be discussed, at the earth's surface 11 primarily from the hot, high pressure water, but may also be retrieved from the turbine exhaust steam.

Figure 2:
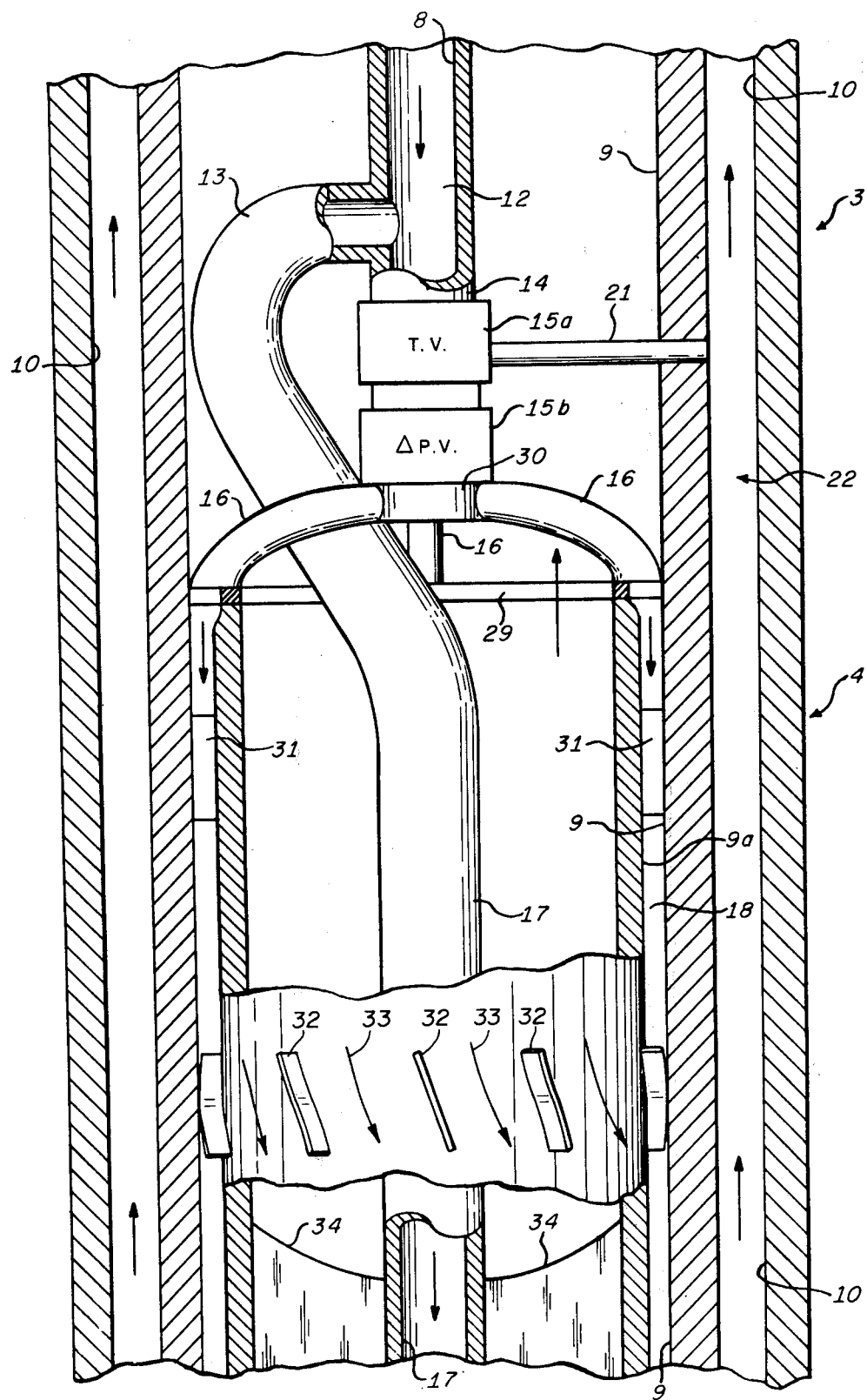
FIGS. 2 and 3 are detailed elevation views in cross section of portions of the apparatus of FIG. 1.

Referring now to FIG. 2, certain details of a preferred form of the steam generator input section 3 and of the steam generator section 4 are illustrated. The general configuration is seen to be similar to that described in connection with FIG. 1. However, in FIG. 2, the tee junction 12 is used to feed two pressure control or regulator devices, a pressure threshold valve 15a in series with which is a differential pressure valve 15b.

Both valves may be generally conventional, or may be modified as will be further discussed in connection with FIG. 16. Threshold valve 15a depends for operation upon sampling the pressure of the rising hot water stream between pipes 9 and 10, and the connecting hollow tube 21 is therefore provided for this purpose. Also, the configuration of FIG. 2 additionally illustrates a symmetric input system for the steam generator 18. For this purpose, an array of radially directed distribution pipes 16 is supplied for conducting the pressure regulated water output of differential pressure valve 15b through apertures in steam generator end plate 29 into the interior of generator volume 18. In this manner, clean water is symmetrically distributed to the annular steam generator 18 where a fraction of the intense heat content passes from the pumped hot water through the wall of pipe 9 for producing the superheated, dry steam.

The alloy pipes 9, 9a are spaced apart and are supported in fixed relation by arrays of radial spacers, such as the representative spacers 31, 31. The spacers 31, 31 may be aligned vertically and it is understood that several such arrays of spacers will preferably be used at intervals along the steam generator walls. In a preferred form of the spacers, they are shaped so that they perform an added function. As noted in the foregoing, fresh water supplied by manifold 22 is converted to super-heated steam as it travels downward in the steam generator annulus 18. In certain applications, it is found that an undesirable proportion of water drops fall through the steam generator volume 18 without being fully vaporized. Since such water drops are more dense than the dry steam, they travel downward much faster than the already vaporized portion of the flow and therefore tend to stay generally at the center of the flowing stream, not impacting the heated surface of pipe 9 where heat transfer is high. In the steam generator 18, there is also an additional complication in that the two-phase stream is flowing downward in an annulus and the inside surface of that annulus (provided by alloy pipe 9a) tends to absorb heat rather than contributing thermal energy to the steam generation process. The heat absorption mechanism is connected with the fact that the rising fluid within pipe 9a is relatively cool turbine exhaust steam. To overcome this undesired result, arrays of spacers such as 32, 32, 32 may be employed; the spacers 32 are no longer vertical, but are shaped and are oriented at finite angles with respect to the vertical. It is understood that several such arrays of spacers 32 will normally be used at intervals along the surface 9a. While the character of the shaping and the average skew angle will depend upon general design considerations, the curved spacers are arranged to swirl the down-flowing dual-phase fluid into generally helical paths, as illustrated by arrow 33. In this manner, the action of centrifugal force tends to force both the water drops and the already converted steam toward the heat source represented by the contiguous surface of pipe 9 and away from the heat sink represented by the contiguous surface of the cooler pipe 9a. The advantageous results are that the previously converted steam is further heated and that any water drops are converted to steam also further heated as it passes down the steam generator volume 18 toward the steam turbine.

It will be appreciated from FIG. 1 that a severe problem to be solved in devising practical forms of the invention lies in creating a configuration which is compact, as well as efficient, especially in view of the consideration that the operating structure is preferably to be inserted into a well casing of standard size. Compactness of the structure, as well as efficiency of operation are therefore prime features of the apparatus of FIGS. 3 through 6, which apparatus is found within the turbine structure section 5 of FIG. 1.

Figure 3:
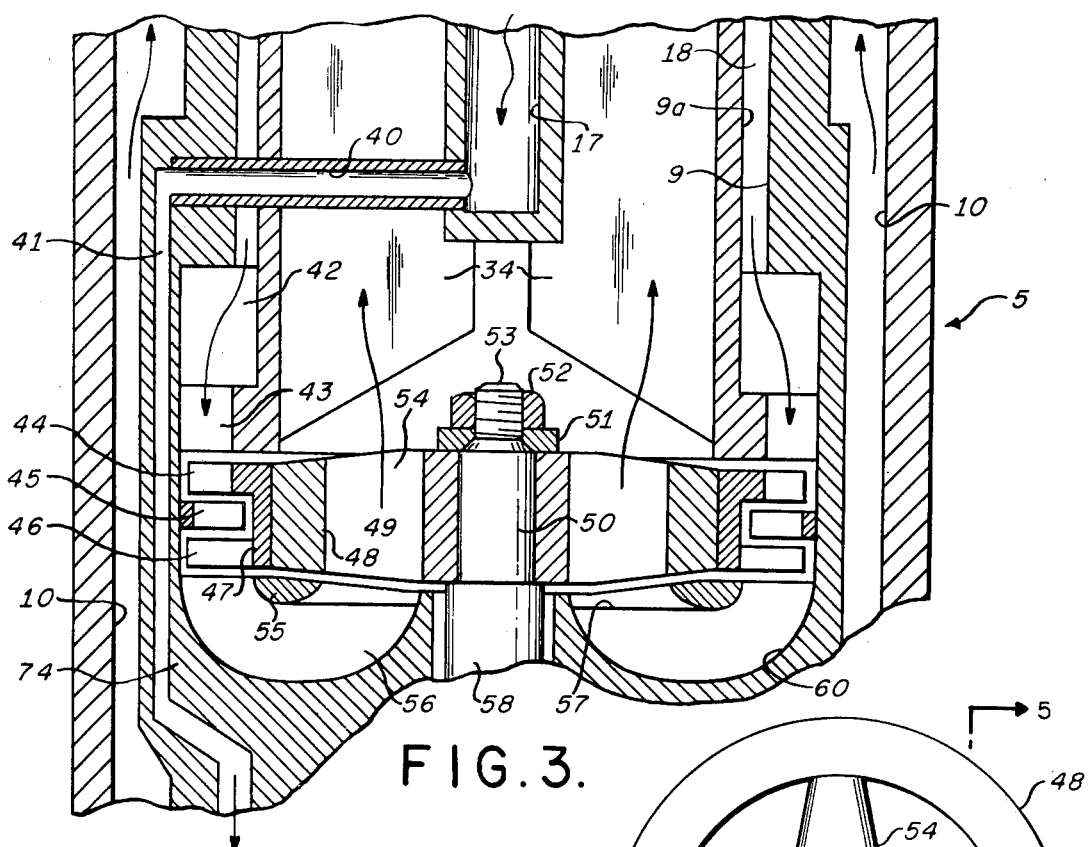

Referring particularly to FIG. 3, it is seen that the conduits of FIG. 2 extend into the steam turbine section 5. For example, the pumped hot water passage is located between pipes 9 and 10, while opposed surfaces of pipes 9 and 9a define the steam output passage 18 of the steam generator. Between pipes 9a and 17 is the passage for upward flowing exhaust steam from the turbine. The pipe 17 is effectively extended to permit downward flow of clean water into and past the steam turbine section 5 via the channels 40 and 41. It is seen that a series of radial spaced vanes 34 welded between pipes 9a and 17 provides a supporting function; within the rising exhaust steam chamber, they additionally tend to redirect the exhaust steam so that it flows in a vertical direction without any substantial rotational motion.

For operating the steam turbine of FIG. 3, the steam from the steam generator 18 between pipes 9 and 9a is injected into an annular manifold 42, from whence it flows into an array of steam injection nozzles at 43 of generally conventional design. The nozzles 59 are shown in more detail at 43 in the developed view of FIG. 6 and are employed in the conventional manner to direct the high velocity steam against the blades of the turbine stages.

Single or multiple stage turbine blade systems of various known types may be employed in the system. However, for purposes of illustration, a multiple stage arrangement is presented, first and second stages being provided by respective pluralities 44 and 46 of vanes which pend in circular arrays from a circular base ring 47. The rotor arrays of vanes 44 and 46 cooperate with an intermediately located conventional array 45 of stator vanes affixed to the body block 74 common to the turbine section 5 and bearing section 6. The ring 47 bearing the vane arrays 44 and 46 is affixed in a conventional manner to a wheel rim 48. Rim 48 is part of a wheel additionally provided with a set of spokes 54 and a hub 49. Hub 49, when the rotor system is rotating, causes shaft portions 50 and 58 also to rotate, the hub 49 being securely fastened on shaft portion 50 by washer 51 and nut 52 secured on the threaded extension 53 of shaft portion 50.

A feature of the invention permitting compactness of design is concerned with the disposal of expanded steam which has yielded useful energy to the turbine rotor; the feature solves the particular problem of redirecting the exhaust steam without the requirement of space consuming elements. For this purpose, the turbine body block 74 contains an annular smoothly curved toroidal passageway 56 which redirects steam issuing from the rotary vane array 46 radially inward towards shaft portion 58, at the same time altering its direction so that the steam is caused to flow upwardly. The annular passageway 56 is defined by a suitably curved surface 60 cast within the body block 74 and by the surface of the opposed annular ring or guide 55. Ring guide 55 may be supported by an array or radially extending vanes 57 which, in addition to supporting the ring guide annulus 55 with respect to turbine body block 74, also tend to redirect the exhaust steam so that its velocity is primarily vertical, rotational components of motion being reduced in amplitude. Accordingly, it is seen that there is formed a smooth-sided toroidal steam expanding passageway directing the steam after it exits the annular vane array 46 until it passes again through the turbine wheel.

Figure 5:
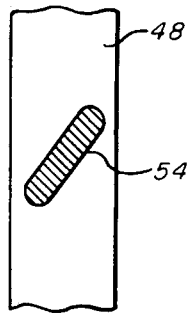
FIG. 5 is a detailed cross section view taken along the line 5—5 of FIG. 4.
Figure 4:
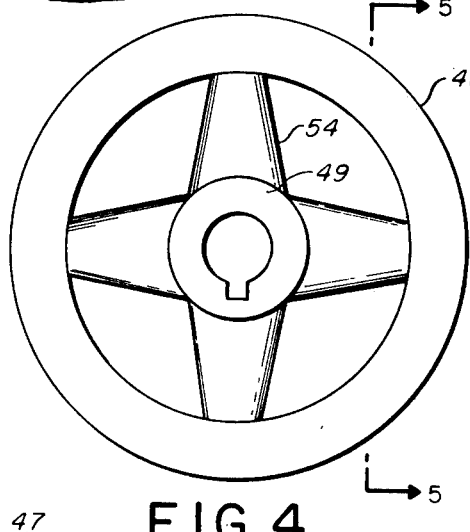
FIG. 4 is a plan view of an element of the FIG. 3 apparatus.
Figure 6:
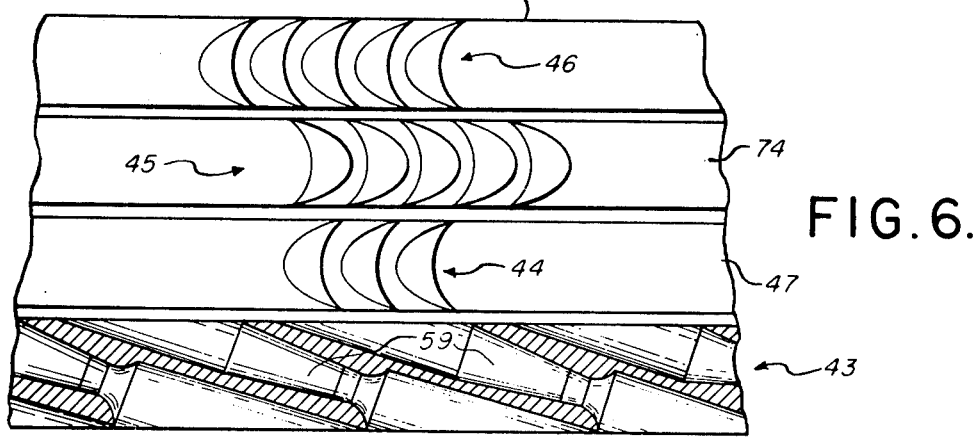
FIG. 6 is a developed drawing partly in cross section of a portion of the FIG. 3 apparatus.

The passage of steam through the latter is particularly facilitated by arranging the spokes 54 of the turbine wheel as illustrated particularly in FIGS. 4 and 5 so that the steam passes through the wheel, in essence, as if the spokes 54 were not present. The spokes 54 are individually tilted with respect to the direction of the rotation of rim 48 so that their effect at the selected operating rotational speed of the rotor is entirely neutral. In fact, spokes 54 are shaped and are provided with an angle of incidence with respect to the direction of steam flow so that they desirably neither add energy nor subtract energy from the upward flowing steam. Further, steam passages outside of the periphery of the rotating element of the steam turbine are not required and the resultant blocking of the flow of the pumped hot well water is avoided. As previously noted, it will be apparent to those skilled in the art that alternative features of known steam turbines may be employed within the scope of the invention. By way of further example, a double-stage re-entry turbine may be employed in which the steam is passed downward through one set of nozzles of a turbine having a single array of blades and is then reversed to flow upward through a second set of nozzles and the same turbine blades, the used steam again being exhausted in the general direction indicated in FIG. 3.

Figure 7:
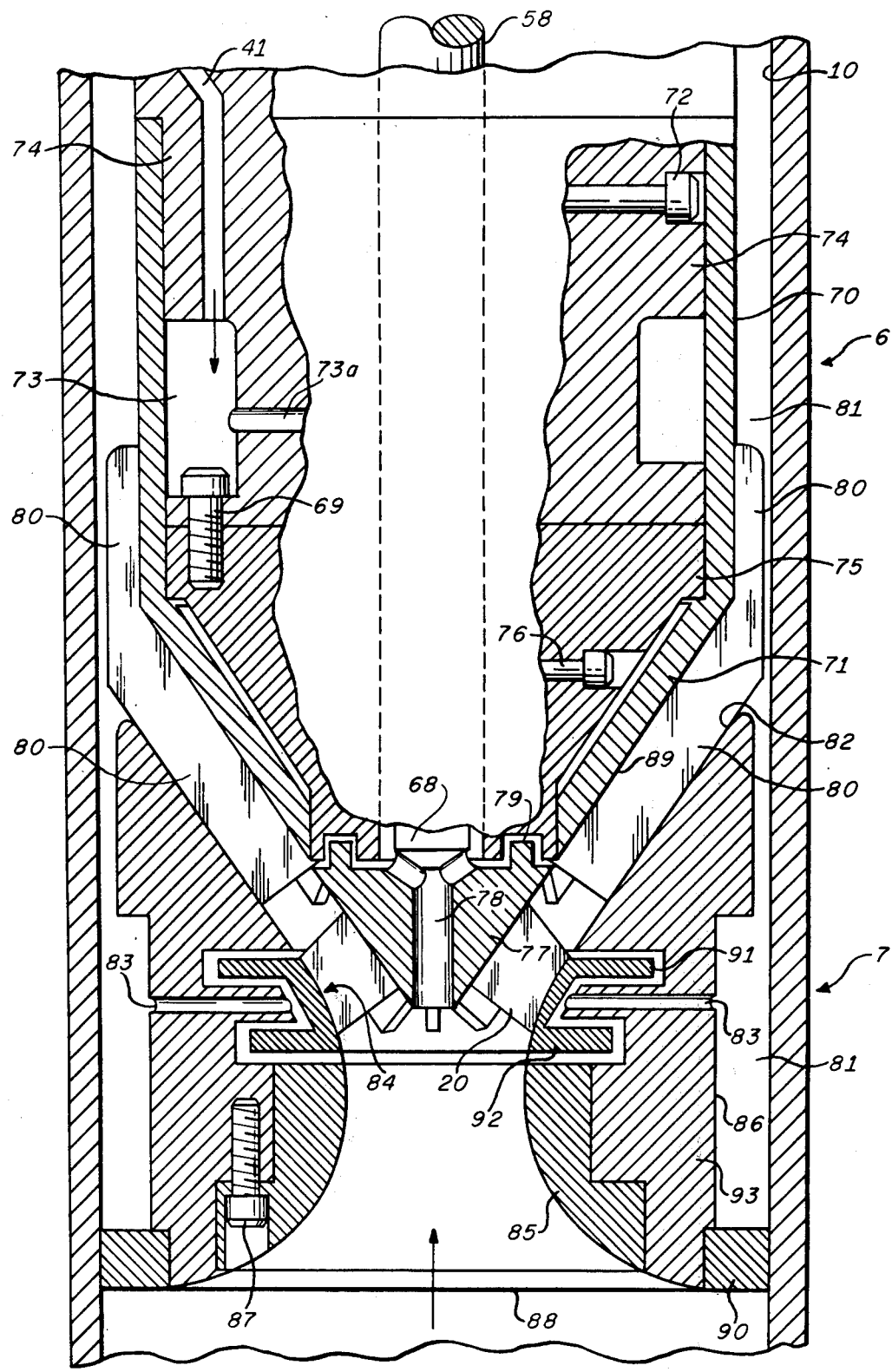
FIG. 7 is a detailed elevation view in cross section of the lower portion of the apparatus of FIG. 1.

FIG. 7 illustrates particularly the relations of elements of the bearing support system 6 and of the hot water pump section 7. With reference to FIG. 3, it is seen that there extends into the apparatus of FIG. 7 the well casing 10 and the bearing or body support block 74 from which is supported by bolts such as bolt 69 a generally conical casting 75 supporting, in turn, the pump apparatus, as will be further described. The castings or blocks 74 and 75 perform several primary functions, including providing a casing for containing the bearing system cooperating with and surrounding the shaft by means of which the steam turbine directly drives the hot water pump. However, for the purpose of providing clarity in the drawings, the bearing system will be discussed separately, especially in connection with FIG. 9. With reference to that discussion, it will be seen that clean lubricating water is supplied through body block 74 via passage 41, annular manifold 73 and the passage or passages 73a to the bearing system. Further, it will be seen that fasteners such as 72 and 76 position certain elements of the bearings relative to casting blocks 74 and 75.

A hardened case is provided to integrate and protect blocks 74, 75 from impact and corrosion and takes the form of a circular element having a hollow cylindrical portion 70 and a truncated hollow conical shell section 71 extending downward in concentric relation with the conical end portion of block 75. The pump end of shaft portion 68 projects beyond the generally co-planar ends of conical shell section 71 and conical block 75 for supporting conical end rotor 77 whose conical sides are, in effect, extension of the conical surface 89 of conical shell element 71. It will be seen that the nose cone rotor 77 supports other rotary elements of the pump, including a plurality of pumping vanes, such as vane 20, and a rotatable section 84 of the pump shroud.

Figure 8:
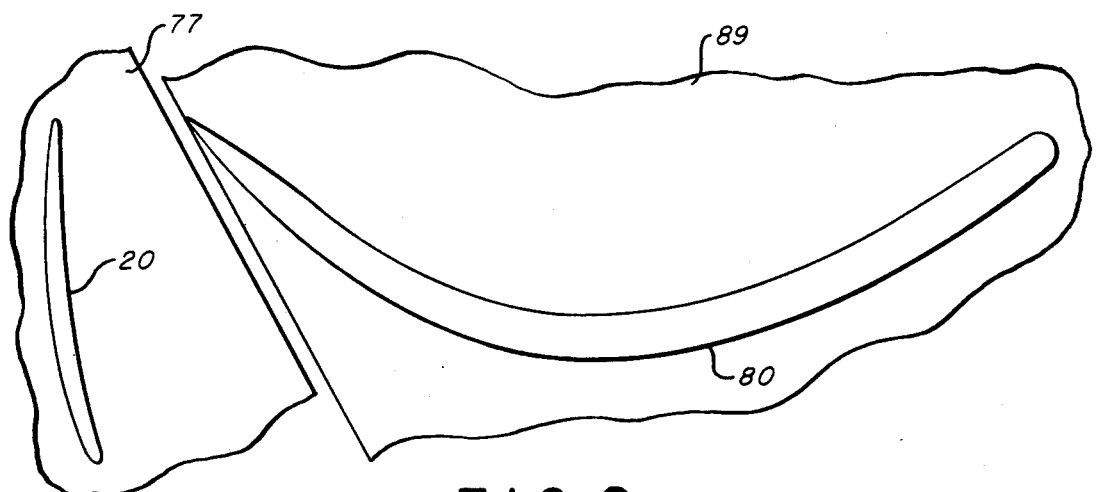
FIG. 8 is a developed drawing of a portion of the apparatus seen in FIG. 7.

Several fixed shroud elements cooperate with the rotatable shroud element 84. These include particularly a generally cylindrical shroud element 93 having an upper conical surface 82 generally of the form of the contour of conical surface 89. The annular shroud element 93 is supported directly from surface 89 by a plurality of stationary stream-directing vanes 80. The vanes 80 act both to support shroud element 93 and also to direct the flow of the pumped hot water. While the vane 80 is illustrated in FIG. 7 as lying generally in the plane of the drawing, the vanes 80 are preferably shaped so as to efficiently convert any rotational component of motion of the pumped hot water into upward translation, thus increasing the hot water high pressure as it ascends. The stator part 93 of the shroud is completed by a throat member 85 of annular construction held in place against shroud element 93 by an array of bolts such as bolt 87. There is thus defined with respect to mouth 88 of the pump, the inner curved surfaces of shroud throat element 85 and of rotatable shroud element 84, and conical surfaces 82 and 89, a passageway by means of which the hot, high pressure water is directed upward at a significantly high velocity for flow within the casing 10. As noted in the foregoing, the plurality of vanes 20 supports rotary shroud element 84 from nose cone 77 for high speed rotation by shaft section 68. While the impeller vanes 20 are shown in the figure as having generally flat plane surfaces, they will preferably take on the hydrodynamic but conventional curved shape shown at 20 in the developed drawing of FIG. 8 for most efficient cooperation with the stationary vanes 80. Flow of hot well water between casing pipe 10 and the stator section 93 of the pump shroud is prevented in any convenient manner, as by use of an annular seal 90 adjacent the pump mouth 88.

Novel features of the invention provide a thrust balance mechanism in the hot water pump configuration. Significant downward axial thrust is encountered with respect to the turbine pump shaft due to the pressure head rise generated by the pump when impelling the hot water upward, this thrust being nearly proportional to total dynamic pressure. Ordinarily with systems in which considerable space is available, large thrust bearings would be employed to carry the large maximum anticipated load. However, such bearings, when used under the present set of hostile circumstances, would be characterized by high levels of power loss and long life and efficiency could certainly not be expected.

The need for finding a mechanism for balancing the high downward axial thrust may be illustrated in a general manner by a specific example. The offered specific example is merely for illustrative purposes, and the values given are not necessarily exact examples of values that would be employed in actual practice.

Consider, for example, that the hot well water pressure at the mouth 88 of the pump throat is about 800 pounds per square inch. In the operating condition of the pump, the pressure in the volume occupied by the impeller vanes 20 would be boosted, for example, to 1050 p.s.i. At the location at which stator or diffusion vanes 80 meet the annulus 81 between casing 10 and the hollow cylinder portions 70, the pressure might be found to be 1150 p.s.i.

When the turbine and pump system is rotating at its intended operational speed, it generates a heavy downward thrust at shaft portion 58 which is normally opposed by the upward thrust of the 800 p.s.i. hot well water against the equivalent area of the shafts. There remains a considerable net downward force which would otherwise require a large thrust bearing to be absorbed. The pressure balance arrangements of FIG. 7 reduce the undesired net downward thrust and thus permit reduced size of the thrust bearings, which bearings will be discussed relative to FIGS. 9, 12, 13, and 14.

A first aspect of the system for reducing the net downward shaft force involves the configuration of the conical rotor or hub end 77. Rotor hub 77 is arranged with a relatively large axial bore 78 and with a labyrinthal seal 79 lying generally in a horizontal plane in close proximity to cooperating labyrinth seal elements on the generally horizontal end of the stationary conical casting block 75. The elements of seal 79 are concentric with shaft end portion 68 and may consist of many concentric ring-shaped labyrinthal elements as is well known in the art, being shown with only a single stage merely for convenience and clarity in the drawing. Thus, hot water may flow axially with respect to bore 78 and radially in the narrow passageway of labyrinth seal 79.

In the absence of the cooperative presence of bore 78 and labyrinthal seal 79 there would, according to the foregoing example, be a pressure at the top of conical end rotor 77 of about 1050 p.s.i. or when the effects of the differing areas of the shaft and end rotor 77 are considered, there would be a downward thrust of 6000 pounds. In the configuration shown in FIG. 7, labyrinthal seal 79 allows only a small amount of hot water flow from the 1050 p.s.i. annulus region 80 radially inward to the top center of rotor hub 77. The high impedance passage way through seal 79 and the low impedance represented by bore 78 cooperate so that the pressure on top of hub 77 is essentially 800 p.s.i., rather than the former 1050 p.s.i., reducing the net downward thrust by 920 pounds. It is noted that the area of the labyrinthal seal 79 is at a pressure intermediate between 800 and 1050 p.s.i., for example.

The second aspect of the system for reducing the downward thrust on the shaft is incorporated in the pump shroud system including shroud stator elements 85, 93 and the shroud rotor element 84, which latter is affixed to and rotates with the pump impeller vanes 20. The interface between the shroud rotor section 84 and the stator shroud elements 85 and 93 accommodates a pair of cooperating annular labyrinthal seal elements 91 and 92. Intermediate the distinct seal sections 91, 92 are openings to passageways 83 connecting to the annular passageway just within casing pipe 10 at a junction tapping the 1150 p.s.i. pressure within pipe 10. The labyrinth seal at 91 has a significantly larger diameter than that of labyrinthal seal 92. The elements of the separated labyrinthal seals 91, 92 will, in usual practice, consist of a conventional plurality of cooperating ring-shaped labyrinth elements.

In view of the passageways 83, there will be a differential pressure, say 100 p.s.i., developed across the seal 91. This differential pressure, acting upward on the differential areas of seal 91 and seal 92 establishes an upward thrust, for instance, of 380 pounds, further to help counteract the downward thrust of the operating pump. Thus, the first and second components of the thrust compensation system greatly reduce the forces on the thrust bearing system yet to be discussed and therefore, a relatively smaller diameter thrust bearing may be employed. By use of the two balancing features, reliability of operation is assured along with minimal losses. The axial thrust and balancing forces are both proportional to the pump discharge pressure, so that the balanced condition prevails over a range of speed and flow conditions.

Figure 9:
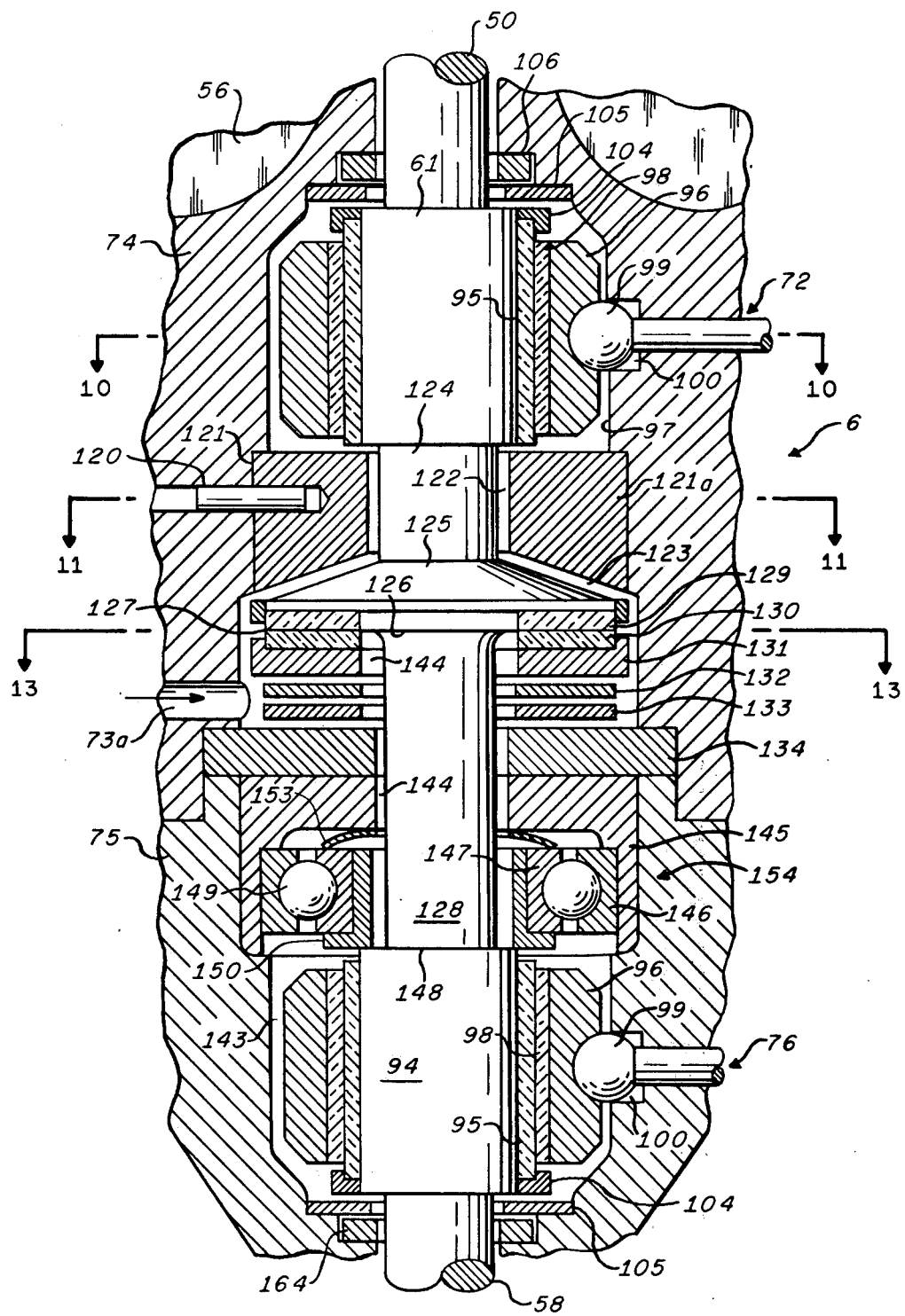
FIG. 9 is a cross section view of a hydrodynamic bearing system for use in the apparatus of FIG. 7.
Figure 14:
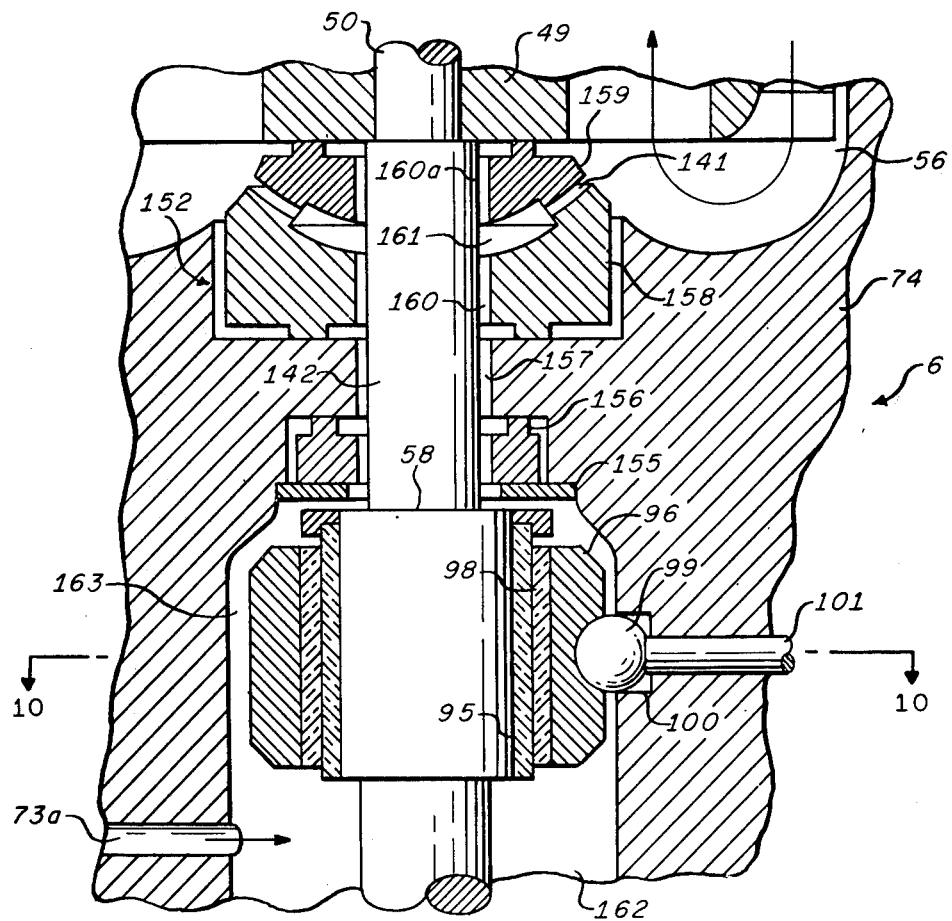
FIG. 14 is a cross section view of a hydrostatic bearing system alternative to that of FIG. 9.

As previously noted, the steam turbine and pump devices of FIGS. 3 and 7 rotate on a shaft whose details are more completely illustrated in FIGS. 9 through 13. Referring now particularly to FIG. 9, the shaft is seen to project through the bearing section 6 between the steam turbine whose rotor is affixed to shaft portion 50 and the water pump whose rotor is attached to shaft portion 58. In general, it is seen that the bearing support structure in bearing section 6 involves four primary elements and that these include a first radial bearing arrangement cooperating with the enlarged shaft portion 61, a thrust bearing section cooperating with the enlarged and tapered section 125, a ball bearing section 154 provided for intermittent use, and a second radial bearing arrangement cooperating with the enlarged shaft portion 94. It will be understood that the turbine-pump shaft bearings are continuously bathed in clean water injected through passage way 73a seen also in FIG. 7 connected to annular manifold 73. The presence of corrosive and contaminated hot well water is prevented by the application of clean water under high pressure to all bearing surfaces. In general, the radial loads due to the shaft are relatively small and are accommodated by tilting pad hydrodynamic bearings associated with shaft portions 61 and 94. The large downward thrust experienced, for instance, during operation of the pump is accommodated by a tilting pad hydrodynamic thrust bearing associated with the tapered enlarged section 125, as will be further discussed in connection with FIG. 12. A hydrostatic thrust bearing may be substituted for the hydrodynamic thrust bearing, as seen in FIG. 14.

It will be further understood that the ball bearing arrangement 154 comes into play only when the shaft thrust is upward during zero or low rotational speeds, a condition existing only during or before start up or after shut down. If a hydrostatic bearing similar to that at 125 were instead provided to accept this upward thrust, the rotational speeds existing during this condition would not be sufficient to generate a separating fluid film between the bearing surfaces, which would consequently suffer damage or destruction. In an extreme case, the steam turbine might not be able to supply the torque needed to start rotation of the system against the frictional effects at the interface of the thrust pad bearings. Accordingly, the ball bearing system's primary function is at the starting of the apparatus and immediately before its rotation completely stops.

It will be noted that clean water flows through the passage 73a into all of the passageways within and around the several bearings, continuously bathing the bearing surfaces with clean cool water. The water flowing into the thrust bearing may flow, for example, between the tilt bearing plates 132 and 133 and will then flow upward through passageways such as 123 and 122 into the radial bearing associated with bearing surface 61. It will lubricate the bearing elements there and will flow upward past the high impedance seal 106, being finally dissipated within the exhaust of the turbine at 56. The annular seal 106 is held by retainer 105 in a confined position and preferably is a seal having very small clearance with respect to the cylindrical surface of shaft portion 50. Such clearance seals are well known in the art and are available in the market, being constructed of tungsten carbide or of aluminum oxide, for example.

The water injected by passage 73a into the thrust bearing also flows downward into passage 144 surrounding shaft portion 128, thus flowing between the races 146, 147 of the ball bearing system 154. Accordingly, the bearing surfaces of the balls and of the races 146, 147 are continuously lubricated with clean water which flows on downward into the radial bearing associated with shaft portion 94. The bearing surfaces associated with this radial bearing are thus also continuously lubricated with clean water, which is then permitted to flow past the annular high impedance seal 164 and is dissipated by flowing into the hot well water being pumped upward, as described in connection with FIG. 7.

Figure 10:
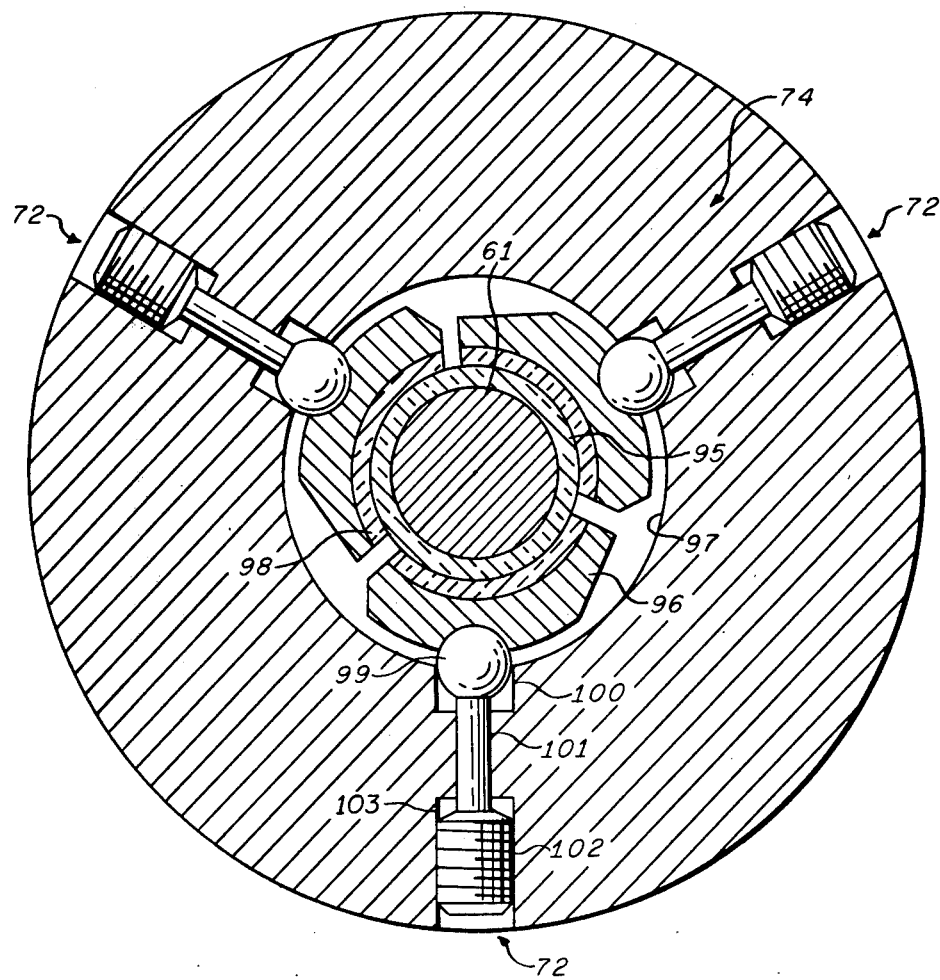
FIG. 10 is a plan view in cross section taken along the line 10—10 of FIG. 9.

Referring now to FIG. 9 and 10, the structure of the two radial bearings respectively associated with shaft portions 61 and 94 will be discussed. Particularly referring to FIG. 10, it is seen that the radial bearing is of generally conventional tilting pad construction and that the shaft portion 61 is surrounded by a hollow cylinder 95 of aluminum oxide affixed to the shaft. In the usual instance, three tilting pad surfaces cooperate with the aluminum oxide cylinder 95, a typical construction employing a fastener 72 including pad positioning shaft 101 which resides in a bore in the body block 74. Pad positioner shaft 101 is located according to the setting of its threaded portion 102, arranged for radial adjustment within body 74. Shaft 101 accommodates, at its opposite end, a hardened steel sphere 99 partially residing at a counterbore 100. Sphere 99 projects into the water filled interior within cylindrical wall 97 of body block 74, where it thrusts against a mating depression in the bearing support block 96. To its inner arcuate surface is fixedly attached, as by brazing or other conventional methods, an arcuate sector 98 made of aluminum oxide. The sector 98 and the cylinder 95 have contiguous surfaces between which there resides a very thin lubricating film of clean water. The cylindrical aluminum oxide element 95 may also be affixed to shaft 61 by brazing or by the use of mechanical fixtures such as the annular flange 104 seen at the top of FIG. 9. In practice, three or more similar tilting pad radial bearings are employed fully to establish the position of shaft portion 61. It will be evident that the radial bearing at the portion 94 of the shaft in FIG. 9 may be similarly constructed and operated.

Figures 12, 13:
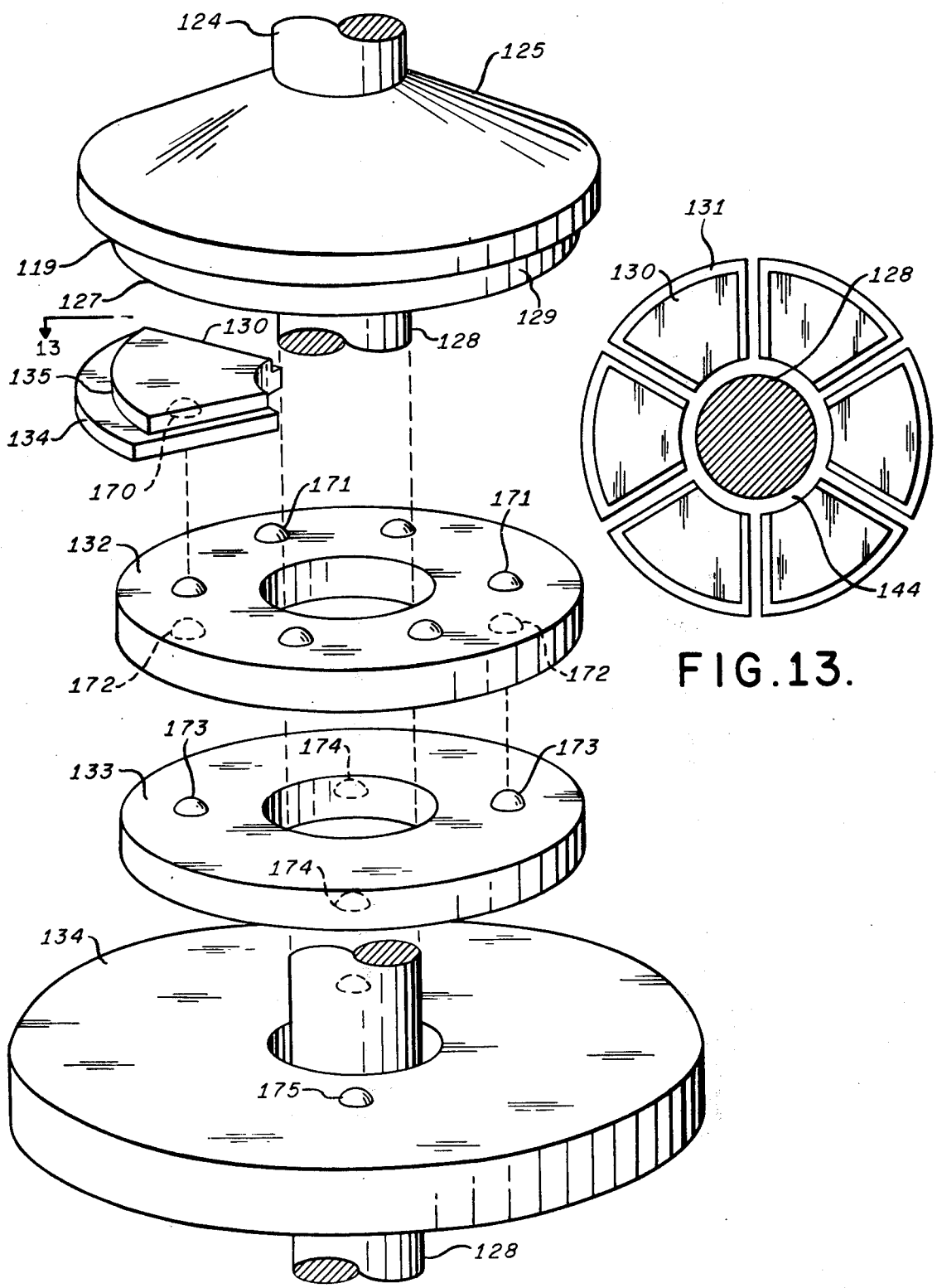
FIG. 12 is an exploded view, partly in cross section, of part of the bearing system of FIG. 9.
FIG. 13 is a plan view taken along the line 13—13 of FIG. 9.

The thrust bearing system is located in FIG. 9 between the two radial bearings associated with shaft portions 61 and 94 and is shown in detail in FIGS. 9, 12 and 13. As seen particularly in FIG. 9, the tilting pad thrust bearing system includes an enlarged and tapered section 125 for supplying a horizontal interfacing surface 126. At the interface surface 126 is fastened with a fluorocarbon viton bonding agent of commercial type or is brazed or otherwise fastened a flat ceramic ring 129 generally concentric with shaft portion 128. The exposed flat annular surface 127 of ceramic ring 129, which may be composed of alumina, forms a thrust bearing surface. As in the instance of the radial bearing, the alumina employed may be of the grade known as COORS 995, which is 99.5 per cent pure aluminum oxide.

As seen most clearly in FIGS. 12 and 13, the flat bearing surface 127 cooperates with a plurality of bearing surfaces, such as the surface of bearing 130, each bearing 130 being associated with a tilt pad thrust bearing element. Each such tilt bearing pad comprises a truncated sector-shaped metal base plate 131 to which the associated sector shaped ceramic bearing 130 may be brazed or otherwise permanently affixed at interface 135. The surface of ceramic bearing 130 is permitted to follow closely to the surface 127 of the annular ceramic ring 129 by a mechanical system yet to be described cooperating with a spherical depression at 170 located centrally in the lower surface of metal base plate 131.

To facilitate tilting of the plural ceramic bearings 130 with respect to the annular support plate 134 as the surface 127 rotates, a pair of tilt bearing plates 132 and 133 is used. Tilt bearing plate 132 is provided with a circular array of hardened spheres 171 providing hemispherical bearing surfaces one each for the respective depressions 170. While ceramic bearing 130 is prevented from rotating about sphere 171 because of the close proximity of the inner portion of bearing 130 to shaft portion 128, the surface of bearing 130 now has some of the degrees of mechanical constraint needed to permit it to follow surface 127 precisely.

Further undesired constraints are removed by tilt bearing plates 132, 133. For this purpose, the upper tilt bearing plate 132 has attached in its lower surface a pair of diametrically located hemispherical depressions 172, 172. These depressions match the locations of hardened spheres 173, 173 affixed at the upper surface of lower tilt bearing plate 133 so that the upper tilting plate may rotate or tilt slightly about the line between spheres 173, 173. In a similar manner, the lower tilting plate 133 is provided in its lower surface with hemispherical depressions 174, 174. Depressions 174, 174 are spaced along a diameter at right angles to the line between depressions 172, 172. Thus, the former cooperate with hardened spheres 175, 175 (one of which is not seen in FIG. 12) affixed in the upper surface of support plate 134. As seen in FIG. 9, the support plate 134 is clamped in fixed relation between the body block 74 and the conical casting block 75. Further, it is seen that elements 132, 133, and 134 are provided with central aperatures through which the shaft projects for rotation and through which clean bearing lubricating water passes. In this manner, the tilt bearing plates 132, 133 act in a limited range as elements of a gimbal system for permitting each bearing surface of the several ceramic bearings 130 seen in FIG. 13 to follow the flat annular surface of ceramic ring 129 with such precision that the separation between the bearing surfaces is maintained precisely by the supporting clean water film.

Figure 11:
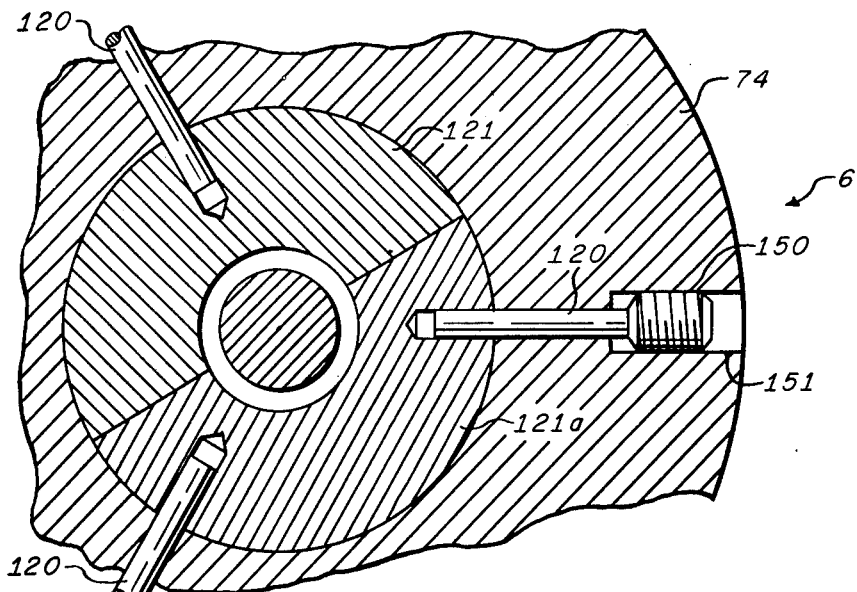
FIG. 11 is a plan view in cross section taken along the line 11—11 of FIG. 9.

FIGS. 9 and 11 illustrate an arrangement of parts made necessary because of tapered portion 125 to facilitate assembly of elements of the invention. An annular element is formed in halves 121, 121a and is held in position by pins or other fasteners 120 threaded as at 150 into a mating threaded bore 151 in body casting block 74, the elements 121, 121a simply largely filling a space within body casting block 74 in which undesirable turbulence might occur in the clean lubricating water. Being generally conformal to the shape of its surrounding walls, the passages 122, 123 are more narrowly defined by the annulus 121, 121a.

In the starting condition of the pump, there is a several hundred pound upward thrust against the main shaft because of the high pressure of the hot well water. The effect of the reverse thrust present in the starting or stopping situation must be reduced or removed, even though the starting cycle may be, for instance, only a minute or so in duration. For this purpose, the ball bearing system 154 of FIG. 9 is interposed, by way of example, between the thrust bearing at the tapered shaft portion 125 and the radial bearing at shaft portion 94. In FIG. 9, the ball bearing system 154 is shown in its actual operating situation, as, for example, during start up or shut down of the entire apparatus. In such a situation, the hot well water pressure forces the shaft upward, so that the upper surface 148 of the enlarged shaft portion 94 is forced against a surface of retainer 150. Its outer race 146 is affixed to outer annular retainer 145, while its inner race 147 is integral with the annular flange-like retainer 150. Thus, the balls 149 of ball bearing system 154 act with races 146, 147 to absorb the transient upward thrust and generally to position the shaft. When the entire apparatus is operating, the shaft is in a downward position and retainer 150 is not rotating, there being clearance between it and surface 148.

Normally, the start cycle is a small fraction of the expected life of ball bearing system 154 under the circumstances. As rotational speed of the apparatus increases, the downward thrust of the pump will exceed the hot well water upward thrust, and the sense of the thrust on the shaft reverses. It will be understood by those skilled in the art that sufficient axial clearances are provided throughout the invention that the shaft, together with its attached turbine and pump rotors, will then move downward, disengaging contact between the end surface 148 of shaft portion 94 and retainer 150, disengaging the ball bearing system 154. Thus, under normal operating conditions, bearing 154 is unloaded and the friction ring 153 acts to prevent incidental rotation of inner race 147 and ring 150.

As noted in the foregoing, a hydrostatic thrust bearing as shown in FIG. 14 may replace and play the role of the hydrodynamic thrust bearing illustrated in FIG. 9. Such a hydrostatic thrust bearing may be used cooperatively with a pair of radial pad bearings of the type shown in FIG. 9, only one such bearing being shown at shaft portion 58 in FIG. 14.

The hydrostatic thrust bearing of FIG. 14 is also lubricated by clean water flowing through passage 73a and consists of rotor and stator parts located in a generally cylindrical cavity 152. The stator 158 surrounds shaft portion 142 with a small clearance passage at 160 of width, for example, 0.002 inches, and is pressure balanced against the non-rotating body casting block 74. Although not actually prevented from rotating, the friction between bearing stator 158 and block 74 is sufficient to prevent stator 158 from turning with shaft portion 142. The bearing rotor 159, which is pressure balanced against the hub 49 of the steam turbine wheel, generally rotates with hub 49. Both the stator 158 and rotor 159 are permitted to move axially relative to shaft portion 142 by slight amounts. Thus, stator 158 and rotor 159 can move axially relative to each other by amounts sufficient to bring their spherical surfaces into natural alignment for supporting a lubricating water film at 141, water for the film being supplied from passageway 73a through annular passages 162, 163, 157, 160, and 161. The hydrostatic pressure unbalance caused by any non-alignment of bearing stator 158 and bearing rotor 159 forces the parts into alignment. The passage 157 includes an annular pressure-dropping seal 156 held in position by retainer 155.

In operation, the high pressure lubricating water flows past pressure dropping seal 156 and across the spherical bearing surface, forming film 141, and is conveniently disposed of in the low pressure steam turbine exhaust passage region 56. If the pressure of the lubricating water appoaching seal 156 is, for example 1400 p.s.i., part of this will appear as a pressure drop across seal 156, with most of the remainder of the drop appearing across the bearing interface within film 141. The bearing 158, 159 is designed so that the average effective pressure in the spherical film 141 acting to separate the components 158, 159 generates an upward force substantially matching the downward thrust of the pump at the chosen operating bearing clearance of film 141 (say, 0.0005 inches). This film thickness changes to match changing loading conditions, increasing slightly with a decreased load and decreasing slightly with an increased load.

Such action obtains because the seal 156 provides a substantially constant impedance, the pressure drop across it being proportional to flow rate, and the bearing impedance changes as the film 141 thickness changes, the pressure drop at the spherical bearing at constant flow rate being inversely proportional to the cube of the film 141 thickness. Accordingly, if bearing 158, 159 is operating stably in a steady state condition and the load is increased:

a. the increased load becomes greater than the hydrostatic force generated in the thrust bearing and the bearing clearance begins to decrease, b. as the clearance decreases, the thrust bearing impedance increases and water flow through the seal 156 accordingly decreases, c. with decreased water flow, the pressure drop across seal 156 decreases and the drop across the bearing increases, and d. the bearing continues to close down until the pressure across the bearing rises to the point that it supports the increased load.

If the load diminishes, the reverse sequence is experienced, the bearing reaching equilibrium with an increased clearance and increased lubricating water flow.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Apparatus for transferring thermal energy from an interior hot stratum of the earth for utilization adjacent the surface of said earth comprising:

means for conveying a first fluid initially in a relatively cool state from a first station adjacent said surface of said earth to a second station adjacent said interior hot stratum, heat exchanger means adjacent said second station for converting a first portion of said first fluid into a working fluid for driving motor means adjacent said second station, pump means adjacent said second station responsive to said motor means for pumping a second fluid from said hot stratum to said first station at a pressure retaining said second fluid solely in liquid state, said pump means having pump rotor means, said motor means having motor rotor means, shaft means for rotationally supporting said pump rotor means and said motor rotor means, radial bearing means for constraining said shaft means for rotation about a predetermined substantially vertical axis, normally operating thrust bearing means for supporting said shaft means, said pump rotor means, and said motor rotor means in a normal substantially vertical position when operating above a predetermined rotational speed, said pump means creating when operating a downward thrust on said shaft means, means adjacent said second station for conveying a second portion of said first fluid at a pressure greater than said second fluid to said radial bearing means and to said normally operating thrust bearing means for lubrication purposes, transiently operable thrust bearing means for supporting said shaft means, said pump rotor means, and said motor rotor means in a second axial position only below said predetermined rotational speed in the substantial absence of said pump means downward thrust.

2. Apparatus as described in claim 1 wherein said transiently operable thrust bearing means comprises:

ball bearing means having first and second race means, said first race means being affixed to stator means of said pump means, said second race means being normally in frictional engagement with said stator means to prevent rotation of said second race means, and an enlarged portion of said shaft means having an annular surface whereby said annular surface is forced against said second race means, overcoming said normal frictional engagement and rotating said second race means when said shaft means moves to said second axial position.

* * * * *